No. 698,012. Patented Apr. 22, 1902.
A. GREVEL.
AIR ESCAPE VALVE.
(Application filed Sept. 13, 1901.)
(No Model.)
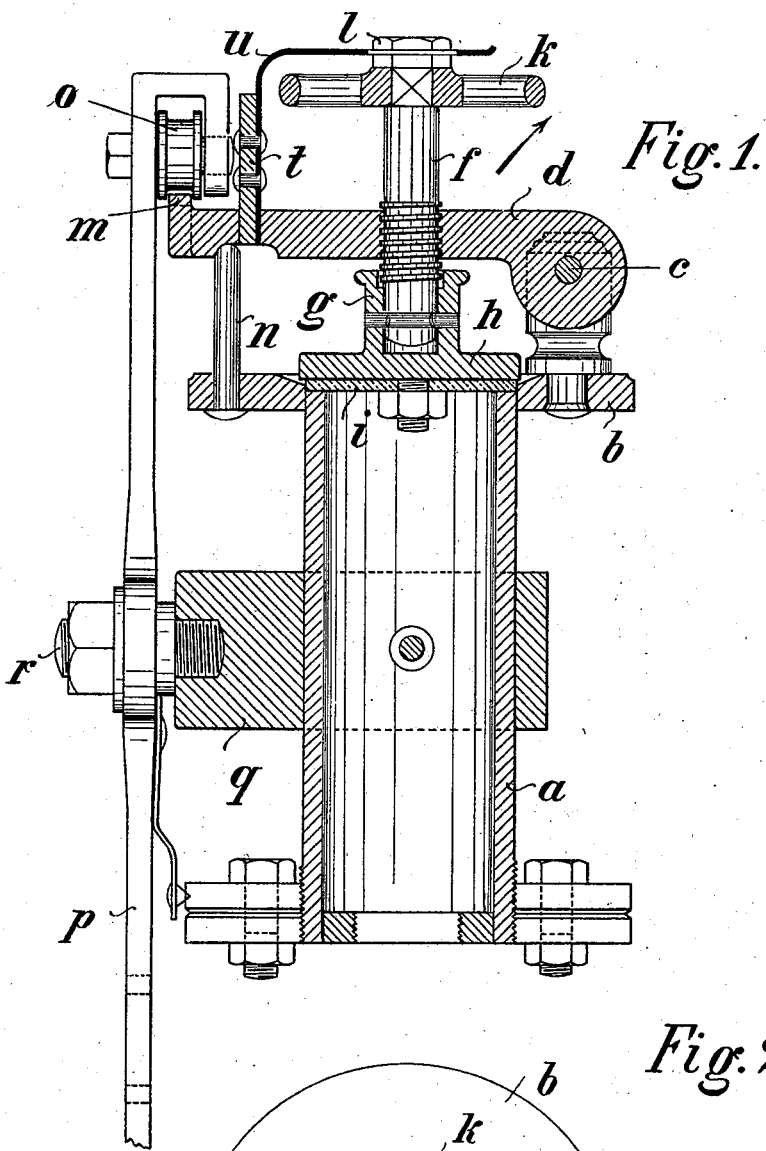
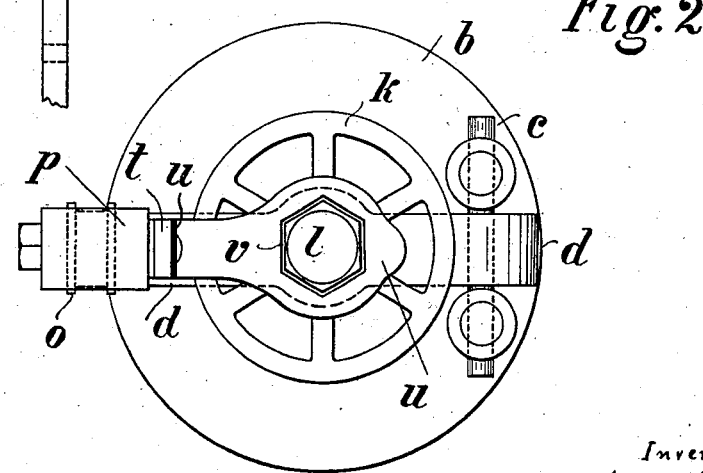
Witnesses:
E. Parreidt.
A. Börner
Inventor:
August Grevel
by Attorney:
Wilh. Düchting.

United States Patent Office.

AUGUST GREVEL, OF COLOGNE, GERMANY.

AIR-ESCAPE VALVE.

SPECIFICATION forming part of Letters Patent No. 698,012, dated April 22, 1902.

Application filed September 13, 1901. Serial No. 75,349. (No model.)

*To all whom it may concern:*

Be it known that I, AUGUST GREVEL, merchant, residing at Cologne, Prussia, Germany, have invented Improvements in Air-Escape Valves, of which the following is a specification.

The present invention is an escape-valve for applying air-brakes on railroad cars or trains while in motion from the road-bed.

The apparatus is fastened to a cylinder connected with the system of air-pipes. This cylinder is closed air-tight by means of a cap or cylinder-head screwed down onto a washer and a suitable cut-off contrivance. The cap or cylinder-head hangs on the threaded spindle, passing through a hinged and revolving lever, on the free end of which a way is provided for a roller on the end of the main lever.

The accompanying drawings illustrate the new air-escape valve.

Figure 1 shows the side view in section. Fig. 2 shows the end view.

The cylinder $a$ is connected with the pipe system of the air-brakes. The flange $b$ of the cylinder $a$ carries the lever $d$, hinged or revolving in the bearing $c$, the lever $d$ having a female thread for receiving the threaded spindle $f$, which fits into the valve $g$ of the cap or cylinder-head $h$. The latter is fitted with an air-tight washer $i$, which is of rubber or other suitable material. The threaded spindle $f$ is provided with a hand-wheel $k$, which is fastened on with a nut $l$. The pin $n$ serves as a stop for the lever $d$. On the free end of the lever $d$, on the opposite end to the bearing $e$, a way $m$ is provided for the roller $o$ of the main lever $p$. The main lever $p$ swings on a stud $r$, screwed into the support $q$ of the cylinder. For locking the spindle $f$ to the hand-wheel $k$ a spring $u$ is fixed to a spur $t$, the spring $u$ fitting over the head of the nut $l$. Of course this locking contrivance or spring-lock can be of any other design.

To make this apparatus ready for service, place the cap or cylinder-head $h$ on the end of the cylinder, with the washer $i$ already in place, place the roller $o$ of the main lever $p$ on the way $m$ of the lever $d$, place the spring $u$ into position, and force the cap or cylinder-head $h$ into the end of the cylinder by turning the hand-wheel $k$, attached to the threaded spindle $f$. When the lower end of the main lever $p$ strikes a spur in its path, the roller $o$ is freed from the way $m$, in consequence of which the lever $d$, together with the cap or cylinder-head and washer $h$ $i$, is forced up by the air-pressure. This results in the immediate application of the air-brakes, bringing the car or train to a stop.

The above-described apparatus needs no looking after and can remain in continual use for any length of time. With the exception of the renewal of the rubber washer $i$, which can last for years, the air-escape valve needs no renewal of parts.

Having now particularly described and ascertained the nature of my said invention and in what manner the same is to be performed, I declare that what I claim is—

An air-escape valve for operating the air-brakes of a car or train from the road-bed, the distinguishing feature of which is that the valve-cap or cylinder-head $h$ is fastened to a lever $d$ by means of a threaded spindle $f$ and through which the cap or cylinder-head $h$ is held in place at the end of the cylinder $a$ so that the main lever $p$ through its roller $o$ bears upon the way $m$.

In testimony that I claim the foregoing as my invention I have signed my name in presence of two subscribing witnesses.

AUGUST GREVEL.

Witnesses:
 CHARLES LE TEMPLE,
 CARL SCHMIDT.